US012428026B2

(12) United States Patent
Milanes et al.

(10) Patent No.: US 12,428,026 B2
(45) Date of Patent: Sep. 30, 2025

(54) METHOD FOR DETERMINING A TRAJECTORY OF AN AUTONOMOUS VEHICLE

(71) Applicant: RENAULT s.a.s., Boulogne-Billancourt (FR)

(72) Inventors: Vicente Milanes, Boulogne-Billancourt (FR); David Gonzalez Bautista, Saint Cyr l'Ecole (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 398 days.

(21) Appl. No.: 17/291,126

(22) PCT Filed: Nov. 5, 2019

(86) PCT No.: PCT/EP2019/080233
§ 371 (c)(1),
(2) Date: May 4, 2021

(87) PCT Pub. No.: WO2020/094639
PCT Pub. Date: May 14, 2020

(65) Prior Publication Data
US 2021/0387641 A1    Dec. 16, 2021

(30) Foreign Application Priority Data
Nov. 5, 2018   (FR) ..................... 18 60171

(51) Int. Cl.
*B60W 60/00*     (2020.01)
*B60W 40/09*     (2012.01)
*B60W 50/00*     (2006.01)

(52) U.S. Cl.
CPC ........ *B60W 60/0011* (2020.02); *B60W 40/09* (2013.01); *B60W 50/0098* (2013.01);
(Continued)

(58) Field of Classification Search
None
See application file for complete search history.

(56) References Cited

U.S. PATENT DOCUMENTS

2015/0344068 A1* 12/2015 Taniguchi ............ B62D 6/008
                                                  701/41
2017/0008522 A1    1/2017 Sato et al.
(Continued)

FOREIGN PATENT DOCUMENTS

EP         2862767 A2 *  4/2015  .......... B60W 30/12
JP      2009-227196 A   10/2009
JP      2016-194816 A   11/2016

OTHER PUBLICATIONS

International Search Report issued on Jan. 24, 2020 in PCT/EP2019/080233 filed on Nov. 5, 2019, 2 pages.
(Continued)

*Primary Examiner* — Jaime Figueroa
*Assistant Examiner* — Jerrod Irvin Davis
(74) *Attorney, Agent, or Firm* — Oblon, McClelland, Maier &Neustadt, L.L.P.

(57) ABSTRACT

A method for determining a trajectory of an autonomous vehicle includes a first phase that is carried out while the trajectory of the vehicle is controlled manually. The first phase includes calculating a first theoretical trajectory of the vehicle, measuring a trajectory actually followed by the vehicle, and calculating a correction factor. Calculating the correction factor includes a comparison of the first theoretical trajectory with the trajectory actually followed. The method also includes a second phase that is carried out while the trajectory of the vehicle is controlled autonomously. The second phase includes calculating a second theoretical trajectory of the vehicle, and calculating a customised trajectory of the vehicle. Calculating the customised trajectory is
(Continued)

based on the second theoretical trajectory and on the correction factor.

11 Claims, 5 Drawing Sheets

(52) U.S. Cl.
CPC .............. *B60W 2050/0018* (2013.01); *B60W 2050/0075* (2013.01); *B60W 2420/403* (2013.01); *B60W 2520/06* (2013.01); *B60W 2520/10* (2013.01); *B60W 2520/12* (2013.01); *B60W 2520/14* (2013.01); *B60W 2540/043* (2020.02); *B60W 2540/30* (2013.01); *B60W 2556/10* (2020.02); *B60W 2556/50* (2020.02)

(56) References Cited

U.S. PATENT DOCUMENTS

| | | | |
|---|---|---|---|
| 2017/0137033 A1 | 5/2017 | Habu | |
| 2017/0232973 A1* | 8/2017 | Otake | B60W 50/10 701/43 |
| 2019/0155294 A1* | 5/2019 | Inoue | B60W 50/08 |

OTHER PUBLICATIONS

French Preliminary Search Report issued on Aug. 27, 2019 in French Application No. 18 60171 filed on Nov. 5, 2018 (with translation of category of cited documents), 3 pages.

\* cited by examiner

METHOD FOR DETERMINING A TRAJECTORY OF AN AUTONOMOUS VEHICLE

TECHNICAL FIELD OF THE INVENTION

The present invention relates to a method for determining a path of an autonomous vehicle. The invention also relates to a steering system for an autonomous vehicle, capable of implementing such a determining method. The invention also relates to a motor vehicle comprising such a steering system.

STATE OF THE ART

So-called autonomous motor vehicles are vehicles that are capable of controlling their path without the assistance of a driver. To this end, autonomous vehicles comprise various sensors connected to an electronic control unit. The electronic control unit computes, by virtue of the information delivered by these sensors, a path that is "theoretical" or in other words "optimal". Next, the electronic control unit sends control commands to a steering system so as to control the steering angle of the steered wheels of the vehicle so that the vehicle follows the theoretical path. The driver of the vehicle need no longer turn the steering wheel, but merely check that the path of the vehicle is correct. However, the path followed by an autonomous vehicle is often very different from the path that the driver would have followed if they themself were controlling the vehicle. This difference in behavior may surprise the driver and their passengers or cause them to worry and/or it may generate discomfort by subjecting the vehicle to unpredictable lateral accelerations.

A method for determining a command for a vehicle is known from publication US 2015/0166069 A1, this method comprising a step of recording the preferences of a driver, a step of identifying a predetermined scenario, then applying a default command based on preferences and on the predetermined scenario. However, such an autonomous driving system does not allow the comfort of the driver and their passengers to be optimized. In addition, the confidence of the driver in the autonomous steering system, or in other words the acceptability of such an autonomous steering system, remains limited.

SUBJECT OF THE INVENTION

The aim of the invention is to provide a method for determining a path of an autonomous vehicle that remedies the above drawbacks and that improves the methods known from the prior art. In particular, the invention allows a method for determining a path of an autonomous vehicle to be implemented that increases the comfort of the driver and their passengers. The method according to the invention aims to achieve an optimum confidence in the steering system of the autonomous vehicle.

The invention relates to a method for determining a path of a vehicle capable of controlling its path autonomously, the method comprising a first phase that takes place while the path of the vehicle is being controlled manually by a driver, the first phase comprising:
 a first step of computing a first theoretical path of the vehicle,
 a second step of measuring a path actually followed by the vehicle, and
 a third step of computing a correction factor, the third step comprising a comparison of the first theoretical path with the path actually followed,
and the method comprising a second phase that takes place while the path of the vehicle is being controlled autonomously, the second phase comprising:
 a fourth step of computing a second theoretical path of the vehicle, and
 a fifth step of computing a personalized path of the vehicle, this computation being based on the second theoretical path and on said correction factor.

The computation of the first theoretical path and/or of the second theoretical path and/or of the personalized path may comprise computing a steering angle of the steered wheels of the vehicle and/or computing a yaw of the vehicle. The measurement of the path actually followed may comprise measuring a steering angle of the steered wheels of the vehicle and/or measuring a yaw of the vehicle.

The computation of the correction factor may comprise comparing the yaw of the vehicle following the first theoretical path with the yaw of the vehicle measured in the second step.

The computation of the second theoretical path may comprise computing a yaw of the vehicle, and the fifth step may comprise multiplying the yaw of the vehicle on the second theoretical path by the correction factor.

The determining method may comprise a sixth step of checking the personalized path of the vehicle, the sixth step comprising:
 a first sub-step of computing a first extreme path of the vehicle and, optionally, a second extreme path of the vehicle, then
 a second sub-step of comparing the personalized path of the vehicle with the first extreme path of the vehicle and, optionally, with the second extreme path of the vehicle.

The determining method may comprise an eighth step of computing a steering command for the steered wheels of the vehicle so that the vehicle follows the personalized path.

The invention also relates to a method for operating a steering system for an autonomous vehicle, the operating method comprising a step of choosing an operating mode of the vehicle from among:
 an operating mode in which the vehicle is controlled autonomously to follow a theoretical path, or
 an operating mode in which the vehicle is controlled autonomously to follow a personalized path as defined above.

The invention also relates to a steering system for an autonomous vehicle, the steering system comprising hardware means and/or software means that implement a method such as defined above, and especially hardware elements and/or software elements designed to implement a method such as defined above.

The steering system may comprise:
 a yaw sensor, and/or
 a sensor of the steering angle of the steered wheels, and/or
 a vehicle speed sensor, and/or
 a camera, and/or
 a GPS sensor.

The invention also relates to a motor vehicle, comprising a steering system such as defined above.

The invention also relates to a computer program product comprising program code instructions stored on a medium that is readable by an electronic control unit with a view to implementing the steps of a method such as defined above when said program is run by an electronic control unit. The invention also relates to a program product for an electronic control unit that is downloadable from a communication network and/or stored on a data medium that is readable by an electronic control unit and/or executable by an electronic control unit, the program product comprising instructions that, when the program is executed by an electronic control unit, lead the latter to implement a method such as defined above.

The invention also relates to a data storage medium that is readable by an electronic control unit and on which is stored a program for an electronic control unit comprising program code instructions for implementing a method such as defined above. The invention also relates to a storage medium that is readable by an electronic control unit, comprising instructions that, when they are executed by an electronic control unit, lead the latter to implement a method such as defined above.

The invention also relates to a signal from a data medium, carrying the computer program product such as defined above.

BRIEF DESCRIPTION OF THE DRAWINGS

These subjects, features and advantages of the present invention will be explained in detail in the following non-limiting description of one particular embodiment, which is given with reference to the appended figures, in which.

DESCRIPTION OF ONE EMBODIMENT

Figure 1:
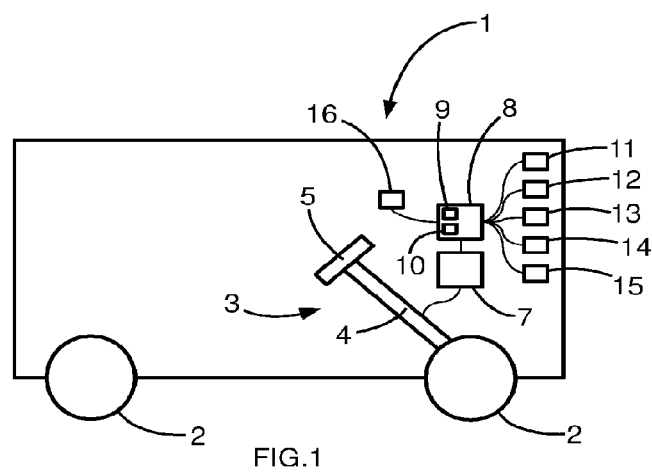
FIG. 1 is a schematic view of a motor vehicle according to one embodiment of the invention.

FIG. 1 schematically illustrates a motor vehicle 1 according to one embodiment of the invention. The vehicle 1 comprises four wheels 2, two of which wheels, at the front of the vehicle, are steered wheels, i.e. wheels that can be oriented so as to direct the vehicle. As a variant, the vehicle 1 could comprise a different number of wheels, for example three wheels or six wheels, and/or could possess more or fewer steered wheels. The vehicle 1 may especially be a private vehicle, a utility vehicle, a truck or a bus. The vehicle 1 conventionally comprises a steering system 3 comprising a steering column 4 and a steering wheel 5 that is fastened to the end of the steering column 4. The steering system further comprises an actuator 7 that is capable of interacting with the steering column 4 or directly with the steered wheels with a view to orienting the steered wheels of the vehicle 1. Thus, the vehicle may be used as an autonomous vehicle, i.e. as a vehicle capable of making its way over a roadway without the intervention of a driver. The steering system 3 also comprises an electronic control unit 8 equipped with a microprocessor 9 and a memory 10. The electronic control unit 8 is able to send control commands to the actuator 7, so that the latter orients the steered wheels of the vehicle 1.

Various sensors of the vehicle 1 are connected to the electronic control unit 8, among which: a yaw sensor 11, a sensor 12 of the steering angle of the steered wheels, a vehicle speed sensor 13, a camera 14, and a GPS sensor 15. These sensors may be integrated into the steering system 3 and be connected, for example by a wired link or wireless link, to the electronic control unit 8. These sensors may also be sensors used by other systems of the vehicle. They may be connected to the electronic control unit 8 via a CAN data bus (CAN being the acronym of controller area network).

The yaw sensor 11 is a sensor of the angular speed of the vehicle about an axis perpendicular to the plane on which the vehicle rests. When the vehicle is resting on horizontal ground, the yaw sensor 11 is therefore a sensor of the angular speed of the vehicle about a vertical axis. Throughout the present application, the term "yaw" designates the yaw rate, and it is therefore a physical value that may be expressed in radians per second. The yaw sensor 11 may be connected to an electronic control unit for controlling the path of the vehicle, also referred to as the "ESP" unit.

The sensor 12 of the steering angle of the steered wheels is a sensor capable of measuring the angular position, or in other words the orientation, of the steered wheels 12. Conventionally, this sensor may be a sensor of steering-wheel angle, in other words a sensor of the angular position of the steering wheel 5 or of the steering column 4 fastened to the steering wheel. This sensor may be connected to the steering wheel 5 or to the steering column 4, provided that the steering wheel or the steering column is itself coupled to the steered wheels, i.e. that their angular positions are correlated in all circumstances. If the orientation of the steering wheel 5 and/or of the steering column 4 may become decorrelated from the steering angle of the steered wheels, especially when the vehicle is operating autonomously, a different sensor will be used to measure the angular position of the steered wheels. The sensor 12 of the steering angle of the steered wheels may also be connected to the electronic control unit for controlling the path of the vehicle.

The speed sensor 13 may consist of a set of sensors integrated into each of the wheels 2 and measuring their speed of rotation. The speed sensor 13 may also be connected to the electronic control unit for controlling the path of the vehicle.

The camera 14 is able to detect the environment in front of the vehicle. In particular, it may detect a marking on the roadway such as, for example, the presence and position of a, continuous or discontinuous, generally white or yellow, boundary line or boundary strip serving to delineate the edges of a roadway or of lanes on the roadway. Advantageously, the camera 14 may also detect other indications useful to correctly positioning the vehicle on the roadway, such as for example arrows marked on the roadway, and/or signs, and/or obstacles and/or other vehicles occupying the roadway.

The GPS sensor 15 (GPS being the acronym of global positioning system) supplies information allowing the GPS coordinates of the position of the vehicle to be computed. The position of the vehicle is sufficiently precise to be able to position the vehicle on the roadway.

Lastly, the steering system 3 also comprises a switch 16, which is advantageously directly accessible by the driver. The switch 16 may take three distinct positions. A first position corresponds to a first operating mode M1 of the vehicle, in which the driver manually controls the path of the vehicle. In this first operating mode, the driver themself controls the direction of the vehicle by operating the steering wheel. A power-steering mechanism may potentially decrease the effort required to turn the wheels; however, the steering angle of the wheels results solely from the will of the driver. In addition, the speed of the vehicle may or may not be controlled by a cruise-control system or by a speed limiter.

A second position of the switch 16 corresponds to a second operating mode M2 of the vehicle, in which the path of the vehicle 1 is defined completely autonomously by the electronic control unit 8. In this second operating mode, the vehicle 1 follows a theoretical path.

A third position of the switch 16 corresponds to a third operating mode M3 of the vehicle, in which the vehicle 1 follows a personalized path defined according to one embodiment of the invention.

Figure 2:
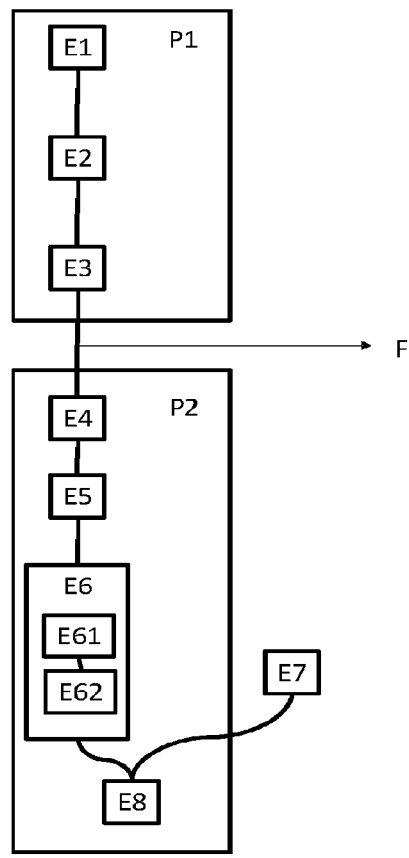
FIG. 2 is a flowchart showing the steps of the determining method according to one embodiment of the invention.

The method that allows this personalized path to be determined will now be described in detail with reference to FIG. 2, which illustrates a method comprising eight steps E1 to E8. The first three steps E1 to E3 are performed in a first phase P1 in which the path of the vehicle is controlled manually by the driver. The first phase P1 is a phase of initialization, or in other words of parameterization or training, of the determining method according to the invention. The four steps E4, E5, E6 and E8 are performed in a second phase P2 in which the path of the vehicle is controlled autonomously. The seventh step E7 may be performed at any time before the eighth step E8.

Figure 3:
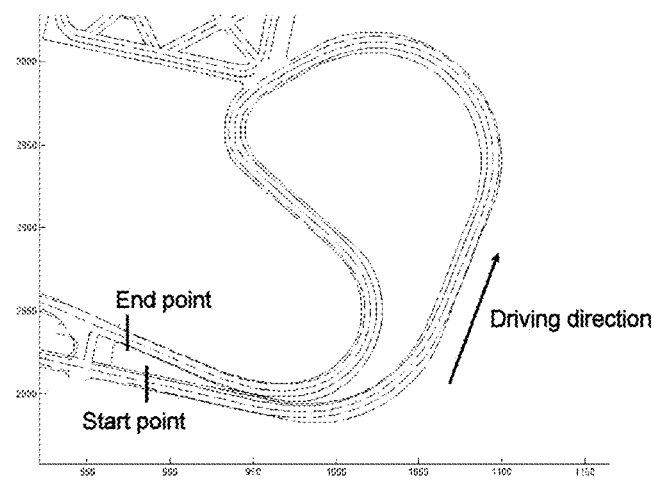
FIG. 3 is a view from above of an automobile route.
Figure 4:
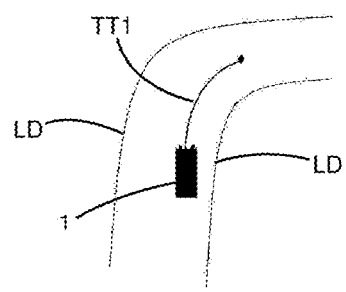
FIGS. 4 and 5 are schematic views from above of a vehicle and of its path over a roadway.

The first step E1 is a step of computing a first theoretical path of the vehicle along a first route. This first route may be any route. For example, the first route may be the route illustrated in FIG. 3 or in FIG. 8. The route illustrated in FIG. 3 comprises a starting line illustrated by "Start point", a finish line illustrated by "End point", and is traveled in the direction indicated by the arrow "Driving direction". This first step may be carried out as the vehicle follows the first route while being driven manually. In this step, the vehicle is controlled manually by the driver. The electronic control unit therefore does not send any control commands to the actuator 7 for the vehicle to follow the first theoretical path. The first theoretical path may especially be defined using the sensors 11, 12, 13, 14 and 15 of the vehicle and depending on the shape of the roadway over which the vehicle is being driven. It is defined completely objectively, in other words completely independently of the driving style of the driver. For example, the first theoretical path, which could also be called the "ideal" path or "optimal" path, may be a path that positions the vehicle at equal distance from the right and left edges of a roadway. With reference to FIG. 4, the first theoretical path TT1 may also be a path that positions the vehicle 1 at equal distance from boundary lines LD marked on the roadway on the right side and on the left side of the roadway. The first theoretical path may also be a path that keeps the vehicle at a given distance from a single boundary line. Whatever the computing mode used to define the theoretical path, the microprocessor 9 of the electronic control unit 8 executes an algorithm based solely on the information delivered by the sensors 11, 12, 13, 14 and 15 of the vehicle. The first theoretical path does not take into account the way in which the driver drives when using the vehicle in the first operating mode M1, i.e. in manual mode. This first theoretical path is stored in the memory 10 of the electronic control unit 8. As a variant, the first theoretical path could also be computed by a computer not on board the vehicle and/or be available in a database not on board the vehicle and then be stored as a digital datum in the memory 10 of the electronic control unit 8. It will be noted that the theoretical yaw, i.e. the yaw of the vehicle following the first theoretical route at a given speed, may be computed from the first theoretical path and the speed of the vehicle.

Figure 5:
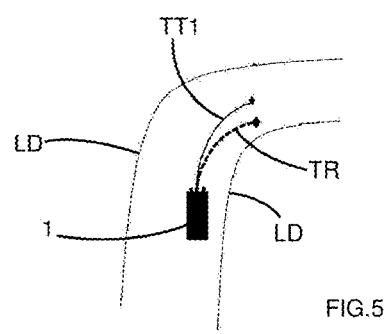

In a second step E2, the path actually followed by the vehicle along the first route is measured. The path actually followed by the vehicle, in other words the real-life path, is independent of the first theoretical path. With reference to an example illustrated in FIG. 5, it may be seen that the real-life path TR is closer to the inside of the bend than the first theoretical path TT1. This real-life path is also stored in the memory 10 of the electronic control unit 8.

According to one variant embodiment of the method according to the invention, the first theoretical path could be recorded while the vehicle is following the first route while being controlled autonomously in the second operating mode M2. Then the real-life path would be measured when the vehicle follows the first route a second time while being controlled manually.

In a third step E3, a correction factor F, or in other words an error rate, is computed by comparing the first theoretical path, computed in the first step E1, with the path actually followed by the vehicle, which was recorded in the second step E2. The correction factor F may for example be a set value or a value dependent on the steering angle of the steered wheels of the vehicle, or a value dependent on the yaw of the vehicle, or a value dependent on the speed of the vehicle, or even a value dependent on the distance separating the real-life path from the first theoretical path. In particular, the correction factor F may be computed by comparing the yaw of the manually controlled vehicle with the theoretical yaw, i.e. the yaw of the vehicle following the first theoretical route at the same speed. By way of variants, it may be envisioned to use other methods to compute the correction factor F.

In the fourth step E4, a second theoretical path along a second route is computed. The second route may be different or identical to the first route. The second theoretical path is computed according to the same principle as the first theoretical path. It may be computed in accordance with one of the computing methods described for the computation of the first theoretical path in the first step E1. If the first route is identical to the second route, then the first theoretical path is logically identical to the second theoretical path.

In the fifth step E5, a personalized path of the vehicle is computed. This computation is based on the second theoretical path computed in the fourth step and on the correction factor F computed in the fourth step. This computation may for example comprise multiplying the yaw of the vehicle if the latter had to follow the second theoretical path by the correction factor F.

The first and/or the second theoretical path, and/or the path actually followed by the vehicle, and/or the personalized path may be stored in different forms in the memory 10. For example, these paths may be stored in the form of a steering angle of the steered wheels of the vehicle as a function of time and/or as a function of a distance traveled by the vehicle. As a variant or in addition, these paths may also be stored in the form of a yaw of the vehicle as a function of an elapsed time and/or as a function of a distance traveled by the vehicle. Lastly, as a variant or in addition, the paths may also be stored in the form of a distance from a guiding line marked on the roadway or else in the form of a GPS trace comprising a set of GPS coordinates.

Figure 6:
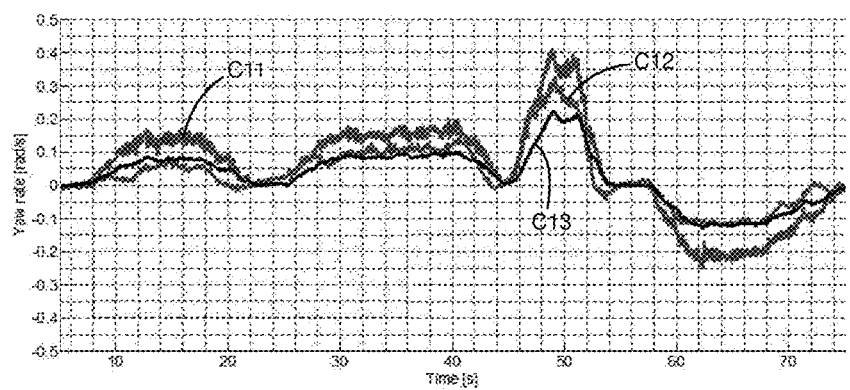
FIGS. 6 and 7 are graphs showing the yaw of a vehicle along a route.

The graph of FIG. 6 illustrates in more detail a first example of the method for determining the personalized path of the vehicle. In this example, the first route is identical to the second route and corresponds to the route illustrated in FIG. 3. Each path is characterized by a curve of the yaw of the vehicle as a function of time: the yaw of the vehicle, expressed in radians per second, is represented on the y-axis. Time, expressed in seconds, is represented on the x-axis. The time required to complete the first route is therefore about 75 seconds.

A first curve C11 represents the yaw of the vehicle as a function of time as the vehicle follows the first theoretical path. This first curve C11 is therefore obtained at the end of the first step E1. A second curve C12 represents the yaw of the vehicle as a function of time when the vehicle is steered manually by the driver. This second curve C12 is therefore obtained at the end of the second step E2. In this step, the driver followed a path that on the whole remained closer to the outside of the bends than the first theoretical path, so as to lower the yaw of the vehicle. The correction factor F may be computed, for example, by dividing an average of the second curve by an average of the first curve. Next, the second theoretical path is computed: the second route being in this example identical to the first route, the second theoretical path is identical to the first theoretical path and is therefore shown by the first curve C11. Lastly, the personalized path of the vehicle is computed by multiplying the first curve C11 by the correction factor F. A third curve C13 representing the personalized path of the vehicle on the second route is thus obtained. It may be seen that the personalized path allows a yaw to be obtained that on the whole is lower than the yaw of the first theoretical path, this indeed corresponding to the driving style of the driver in the second step E2, i.e. to a rather careful driving style.

Figure 7:
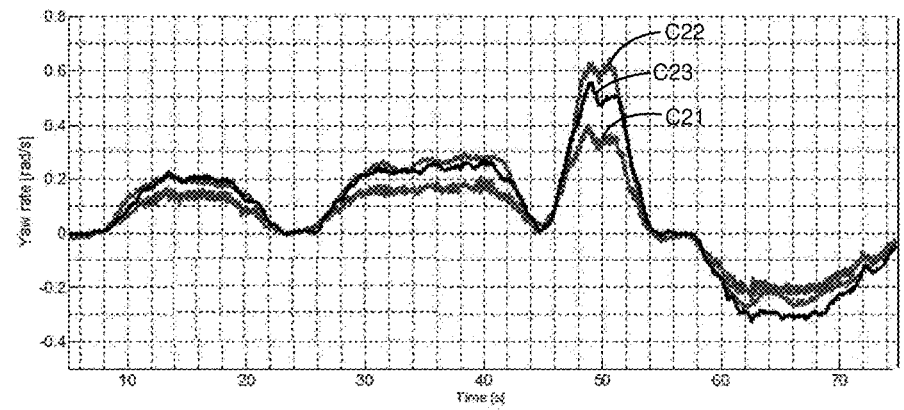

The graph of FIG. 7 illustrates a second example of the method for determining the personalized path of the vehicle. The first route and the second route also correspond to the route in FIG. 3. The determining method is identical to that presented previously with reference to FIG. 6. Therefore, the first curve C21 corresponding to the first theoretical path is identical to the first curve C11 seen previously. In contrast, this time, while the vehicle was being controlled manually, the driver followed a path that on the whole remained closer to the inside of the bends than for the first theoretical path, so as to increase the yaw of the vehicle. The second curve C22 obtained at the end of the second step E2 therefore exhibits a yaw that on the whole is higher than the yaw of the first theoretical path. By applying the same computing method as seen in the previous example, the third curve C23 representing a new personalized path of the vehicle on the second route is obtained. It may be seen that this new personalized path produces a yaw that on the whole is higher than the yaw of the first theoretical path, this indeed corresponding to the driving style of the driver in the second step E2, i.e. to a rather sporty driving style.

Figure 8:
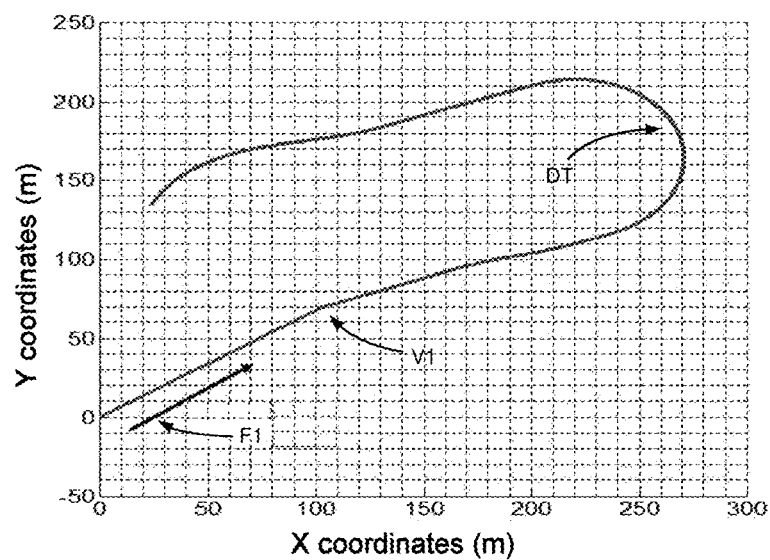
FIG. 8 is a view from above of an automobile route.
Figure 9:
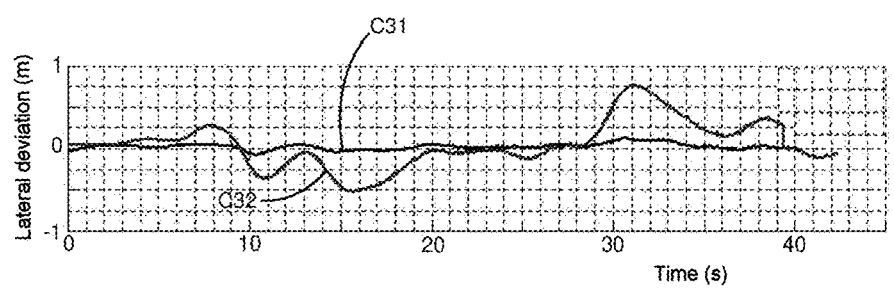
FIG. 9 is a graph showing a lateral deviation of a vehicle along a route.
Figure 10:
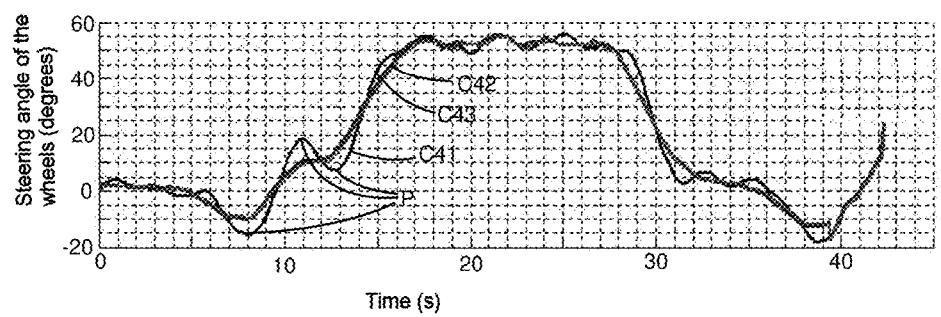
FIG. 10 is a graph showing the steering angle of the steered wheels of a vehicle along a route.

A third example of use of the determining method according to the invention is illustrated by FIGS. 8, 9 and 10. FIG. 8 illustrates a view from above of a route indicated by a guiding line LD marked on the ground. This route comprises a slight bend V1 to the right followed by a U-turn bend DT to the left and is traveled in the direction of the arrow F1. FIG. 9 is a graph showing the lateral deviation (expressed in meters) of the vehicle from the guiding line LD as a function of the time required to follow the route of FIG. 8. A first curve C31 represents the lateral deviation obtained when the vehicle is controlled autonomously, so as to follow a theoretical path along the guiding line LD. It may be seen that the vehicle does not deviate by more than a few centimeters, or even a few tens of centimeters from the guiding line LD.

A second curve C32 represents the lateral deviation obtained when the vehicle is controlled manually. It may be seen that the vehicle deviates by several tens of centimeters, or even one meter, on either side of the guiding line LD. It will be noted that such a distance from the guiding line does not create any risk with respect to the safety of the driver because the roadway is sufficiently wide. These deviations from the guiding line LD are an expression of the driving style of the driver.

FIG. 10 is a graph showing the steering angle of the steered wheels as a function of the time required to follow the route of FIG. 8. A first curve C41 represents the steering angle of the steered wheels when the vehicle is controlled autonomously, so as to follow a theoretical path. This curve comprises a plurality of inflection points P corresponding to variations in the steering angle of the steered wheels. These inflection points P may generate lateral acceleration and/or jerks that will be felt by the driver and/or by their passengers. A second curve C42 represents the steering angle of the steered wheels when the vehicle is controlled manually. This second curve does not comprise any inflection points or else these inflection points are clearly less marked than for the first curve. Compared to the path obtained when the vehicle is controlled autonomously, such as represented by curve C41, the path obtained when the vehicle is controlled manually deviates further from the guiding line LD but also produces less lateral acceleration and/or fewer jerks. A third curve C43 represents the steering angle of the steered wheels when the vehicle follows a personalized path according to the invention. This third curve is almost coincident with the second curve. A behavior of the vehicle, or in other words a driving style, that is a very good reproduction of the behavior or driving style of a driver controlling the path of the vehicle themself has therefore been achieved.

In a sixth step E6, the personalized path of the vehicle is checked. The purpose of this check is especially to check whether the dimensions of the roadway indeed allow the personalized path to be followed, or in other words whether the path of the vehicle may deviate from the theoretical path. This sixth step comprises a first sub-step E61 of computing a first extreme path of the vehicle and a second extreme path of the vehicle. The first extreme path may correspond to the innermost path that the vehicle may follow round a bend without the vehicle leaving the roadway and without the vehicle losing its grip. The second extreme path may correspond to the outermost path that the vehicle may follow round a bend without the vehicle leaving the roadway and without the vehicle losing its grip. These paths may be determined using sensors of the vehicle such as the yaw sensor 11, the sensor 12 of steering angle of the steered wheels, the speed sensor 13, the camera 14 and the GPS sensor 15, and optionally using an electronic control unit for controlling the path of the vehicle.

In a second sub-step E62, the personalized path of the vehicle is compared with the first extreme path of the vehicle and with the second extreme path of the vehicle. If the personalized path is contained between the two extreme paths then it may be used to define a control command for steering the steered wheels. If the personalized path is not contained between the two extreme paths then it is the theoretical path that is used to define a control command for steering the steered wheels. Concretely, extreme yaw values may for example be associated with the two extreme paths. A maximum extreme yaw value corresponds to the path closest the inside of a bend. A minimum extreme yaw value corresponds to the path closest the outside of a bend. It is then checked that the yaw of the personalized path is indeed contained between these two extreme values.

As a variant, this sixth step E6 could be omitted for example if there is no risk, on the roadways over which the vehicle is being driven, of the roadway being left or of grip being lost, or indeed for example if the correction factor F is defined so as to induce only small modifications to the theoretical path. The check could also be made with respect to a single extreme path: the innermost path round a bend or the outermost path round a bend.

In the seventh step E7, a choice is made of one vehicle operating mode from the second and third operating modes M2, M3 or from the three operating modes M1, M2, M3 described above. To this end, the driver may actuate the switch 16. The second operating mode M2 may only be made accessible after an initialization phase P1. The seventh step E7 may not form part of the method for determining the personalized path but rather part of a broader operating method encompassing the method for determining the personalized path, which would then comprise only steps E1 to E6 and E8. Step E7 may be carried out before steps E1 to E6. Thus, if at the end of the seventh step E7 the driver chooses the first operating mode or the second operating mode, steps E1 to E6 are not necessarily carried out. The choice of the operating mode may be made in the second operating phase P2, to switch from the second operating mode M2 to the third operating mode M3 or vice versa.

In the eighth step E8, a command for steering the steered wheels of the vehicle is computed. The electronic control unit 8 transmits to the actuator 7 a command for steering the steered wheels depending on the position of the switch 16 and depending on the result of the check of the personalized path carried out in the sixth step E6. If the switch is in its first position, the vehicle is controlled manually. If the switch 16 is in its second position, the vehicle is controlled autonomously and follows the theoretical path. If the switch is in its third position and if the check of the personalized path carried out in the sixth step E6 allows it, then the vehicle follows the personalized path.

Figure 11:
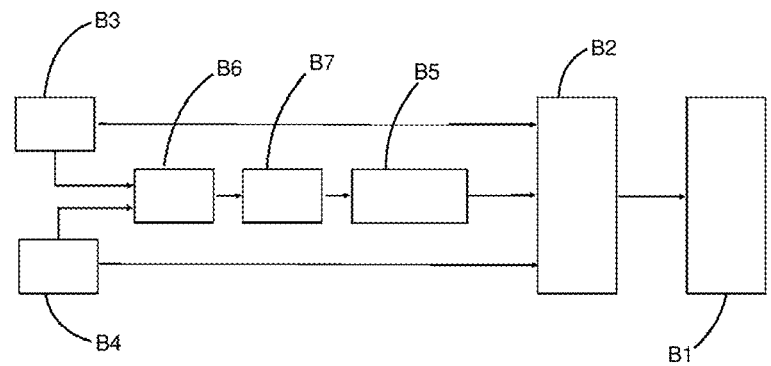
FIG. 11 is a block diagram of a determining method according to one embodiment of the invention.

FIG. 11 summarizes in other terms the determining method described above. Reading this diagram from right to left (i.e. from the end of the method to the start of the method), a block B1 implements the eighth step E8, i.e. it generates a command for steering the steered wheels depending on a path command received upstream. Upstream of the block B1, a block B2 symbolizes the sixth step E6, i.e. the choice of a vehicle operating mode from the three operating modes M1, M2, M3 described above. Three different path commands may therefore reach block B2. The first path command, symbolized by the block B3, corresponds to manual control of the path, i.e. control resulting from the action of the driver on the steering wheel of the vehicle. The second path command, symbolized by block B4, corresponds to a theoretical control of the path. The third path command, symbolized by block B5, corresponds to a personalized control of the path. As explained above, personalized control of the path is obtained by combining manual control of the path with theoretical control of the path. This combination is carried out by the block B6, which is called the "training module". The block B6 in particular implements the third step E3 in which the correction factor F is computed by means of a comparison of a manual control of the path and a theoretical control of the path. Then the block B7 implements the sixth step E6 in which the personalized path is checked.

By virtue of the invention, a method that allows the path of an autonomous vehicle to be tailored to the driving habits and/or style of a driver is obtained. The personalized control of the path is a combination of an optimal theoretical path with the driving habits or style of a driver. The driver does not need to parameterize the desired driving style themself, since it is enough for the driver to use their vehicle at least once in manual mode to define their driving style. The path followed by the vehicle is thus more readily predictable by the driver and the latter is therefore more inclined to trust the steering system of the autonomous vehicle.

The first phase P1, called the initialization phase, may be repeated as often as required to refine the correction factor or to change it depending on new driving habits of the driver. The electronic control unit may store different correction factors associated with different drivers of the vehicle. Thus, after identification of the driver of a vehicle, the correction factor associated therewith may be used. The correction factor may also be chosen manually from a plurality of previously stored correction factors. It may also be automatically determined depending not only on the driver but also on the passengers present in the vehicle.

The invention claimed is:

1. A method for determining a path of a vehicle configured to control the path autonomously, the method comprising:
    conducting a first phase that takes place while the path of the vehicle is being controlled manually by a driver, the first phase comprising:
        computing a first theoretical path of the vehicle,
        measuring a path actually followed by the vehicle, and
        computing a correction factor, the computing the correction factor comprising a comparison of the first theoretical path with the path actually followed; and
    conducting a second phase that takes place while the path of the vehicle is being controlled autonomously such that the vehicle is controlled to move along a roadway without intervention of the driver, the second phase comprising:
        computing a second theoretical path of the vehicle,
        computing a personalized path of the vehicle, the computing the personalized path being based on the second theoretical path and on said correction factor, and
    computing a steering command for steered wheels of the vehicle wherein the method further comprises:
    checking the personalized path of the vehicle, the checking the personalized path of the vehicle comprising:
        computing a first extreme path of the vehicle and a second extreme path of the vehicle, the first extreme path corresponding to an innermost path that the vehicle can follow around a bend without the vehicle leaving the roadway or losing its grip, and the second extreme path corresponding to an outermost path that the vehicle may follow around a bend without the vehicle leaving the roadway or losing its grip, then
        comparing the personalized path of the vehicle with the first extreme path of the vehicle and with the second extreme path of the vehicle,
    wherein when personalized path is contained between the first extreme path and the second extreme path, then the personalized path is used to define the steering command, and
    when the personalized path is not contained between the first extreme path and the second extreme path, then the second theoretical path is used to define the steering command.

2. The determining method as claimed in claim 1, wherein the computing the first theoretical path and/or the computing the second theoretical path and/or the computing the personalized path comprises at least one of:
- computing a steering angle of steered wheels of the vehicle, and
- computing a yaw of the vehicle, or wherein the measuring the path actually followed comprises at least one of:
- measuring the steering angle of the steered wheels of the vehicle, and
- measuring the yaw of the vehicle.

3. The determining method as claimed in claim 1, wherein the computing the correction factor comprises comparing a yaw of the vehicle following the first theoretical path with the yaw of the vehicle being during the measuring the path.

4. The determining method as claimed in claim 1, further comprising checking the personalized path of the vehicle, the checking the personalized path of the vehicle comprising:
- computing a first extreme path of the vehicle, then
- comparing the personalized path of the vehicle with the first extreme path of the vehicle.

5. A method for operating a steering system for an autonomous vehicle, comprising:
- choosing an operating mode of the vehicle from among:
  - an operating mode in which the vehicle is controlled autonomously to follow a theoretical path, and
  - an operating mode in which the vehicle is controlled autonomously to follow a personalized path determined by the determining method as claimed in claim 1.

6. A steering system for an autonomous vehicle, comprising:
- hardware configured to implement the determining method as claimed in claim 1.

7. The steering system as claimed in claim 6, wherein the hardware comprises at least one of:
- a yaw sensor,
- a sensor of the steering angle of steered wheels,
- a vehicle speed sensor,
- a camera, and
- a GPS sensor.

8. A motor vehicle, comprising:
- the steering system as claimed in claim 6.

9. A non-transitory computer readable medium storing a program product comprising program code instructions that, when executed by an electronic control unit, causes the electronic control unit to execute the determining method as claimed in claim 1.

10. A method for determining a path of a vehicle configured to control the path autonomously, the method comprising:
- conducting a first phase that takes place while the path of the vehicle is being controlled manually by a driver, the first phase comprising:
  - computing a first theoretical path of the vehicle,
  - measuring a path actually followed by the vehicle, and
  - computing a correction factor, the computing the correction factor comprising a comparison of the first theoretical path with the path actually followed; and
- conducting a second phase that takes place while the path of the vehicle is being controlled autonomously such that the vehicle is controlled to move along a roadway without intervention of the driver, the second phase comprising:
  - computing a second theoretical path of the vehicle,
  - computing a personalized path of the vehicle, the computing the personalized path being based on the second theoretical path and on said correction factor, and computing a steering command for steered wheels of the vehicle follows the personalized path, wherein the computing the second theoretical path comprises computing a yaw of the vehicle, and the computing the personalized path comprises multiplying the yaw of the vehicle on the second theoretical path by the correction factor.

11. A method for determining a path of a vehicle configured to control the path autonomously, the method comprising:
- conducting a first phase that takes place while the path of the vehicle is being controlled manually by a driver, the first phase comprising:
  - computing a first theoretical path of the vehicle,
  - measuring a path actually followed by the vehicle, and
  - computing a correction factor, the computing the correction factor comprising a comparison of the first theoretical path with the path actually followed; and
- conducting a second phase that takes place while the path of the vehicle is being controlled autonomously such that the vehicle is controlled to move along a roadway without intervention of the driver, the second phase comprising:
  - computing a second theoretical path of the vehicle,
  - computing a personalized path of the vehicle, the computing the personalized path being based on the second theoretical path and on said correction factor, and computing a steering command for steered wheels of the vehicle follows the personalized path, wherein the computing the correction factor comprises comparing a yaw of the vehicle following the first theoretical path with the yaw of the vehicle being during the measuring the path, and the method further comprising obtaining a first curve that represents the yaw of the vehicle following the first theoretical path and obtaining a second curve that represents the yaw of the vehicle during the measuring the path, wherein the correction factor is computed by dividing an average of the second curve by an average of the first curve.

* * * * *